US011032403B2

(12) United States Patent
Leung (10) Patent No.: US 11,032,403 B2
(45) Date of Patent: Jun. 8, 2021

(54) METHOD TO AID THE WALKING-WHILE-TEXTING SMART PHONE USER NAVIGATE AROUND OBSTACLES IN THE FORWARD PATH

(71) Applicant: Daniel L C Leung, Toronto (CA)

(72) Inventor: Daniel L C Leung, Toronto (CA)

( * ) Notice: Subject to any disclaimer, the term of this patent is extended or adjusted under 35 U.S.C. 154(b) by 0 days.

(21) Appl. No.: 16/358,771

(22) Filed: Mar. 20, 2019

(65) Prior Publication Data
US 2019/0297174 A1    Sep. 26, 2019

Related U.S. Application Data

(60) Provisional application No. 62/646,457, filed on Mar. 22, 2018.

(51) Int. Cl.
*H04M 1/02* (2006.01)
*G06F 3/0488* (2013.01)
*H04N 5/225* (2006.01)

(52) U.S. Cl.
CPC ...... *H04M 1/0264* (2013.01); *G06F 3/04886* (2013.01); *H04N 5/2252* (2013.01); *H04N 5/2253* (2013.01); *H04N 5/22525* (2018.08); *G06F 2203/04803* (2013.01)

(58) Field of Classification Search
CPC .............. H04M 1/0264; H04N 5/2252; H04N 5/22525; H04N 5/2253; G06F 3/04886; G06F 2203/04803
See application file for complete search history.

(56) References Cited

U.S. PATENT DOCUMENTS

| 7,392,071 | B2 | 6/2008 | Pan | |
|---|---|---|---|---|
| 7,425,100 | B2 | 9/2008 | Castaneda et al. | |
| 9,452,062 | B2 * | 9/2016 | He | A61F 2/4465 |
| 9,503,697 | B2 * | 11/2016 | Gredinger | H04N 5/2256 |
| 9,654,675 | B2 | 5/2017 | Kessler | |
| 10,171,714 | B2 * | 1/2019 | Cohen | H04N 5/23293 |
| 2005/0001922 | A1 | 1/2005 | Lee et al. | |
| 2006/0197863 | A1 | 9/2006 | Kim | |
| 2012/0262582 | A1 * | 10/2012 | Kimchi | H04M 1/72569 348/159 |
| 2013/0231157 | A1 | 9/2013 | Chung | |
| 2013/0293586 | A1 * | 11/2013 | Kaino | G06F 3/048 345/633 |
| 2014/0078389 | A1 * | 3/2014 | Merz | G03B 17/17 348/375 |
| 2015/0123992 | A1 | 5/2015 | Mahan | |
| 2017/0323159 | A1 * | 11/2017 | Cohen | G06K 9/00671 |

* cited by examiner

*Primary Examiner* — Luong T Nguyen (57) ABSTRACT

Texting while walking is a behavior oftenly seen with the advent of extensive mobile networks and the popularity of smart phones. It is also related to the recent general expectation of immediate notification and response. Despite accidents are frequent with this activity, as the users cannot see their forward paths, there has not been any effective aid to prevent such occurrences. The present invention provides new features and designs enabling the cameras in smart mobile communication devices to continuously and automatically provide views of the forward paths on the screens, while maintaining the compactness of smart phones, for users who are texting while walking to safely navigate.

18 Claims, 8 Drawing Sheets

METHOD TO AID THE WALKING-WHILE-TEXTING SMART PHONE USER NAVIGATE AROUND OBSTACLES IN THE FORWARD PATH

FIELD OF THE INVENTION

This present invention pertains to safety aids for mobile communication device users who are walking and texting.

BACKGROUND OF INVENTION

Texting while walking is a common activity of smart phone users, especially when information has to be communicated urgently. This action is made possible with advents in several areas in communication technology, including extensive digital mobile networks and compact smart communication devices such as smart phones. However, the body postures of texting while walking prevent the users from seeing the forward paths, resulting in accidents. The lack of any safety provision can be attributed to the fact that texting while walking activity came to be by coincidence of technological progress in different fields, and not foreseen or planned by any of the parties contributing to the realization. The present invention provides a much needed safety feature by employing new camera designs and methodology to provide navigation ability to such users.

In a smart mobile communication devices, such as a smart phone, or a smart tablet, there is the provision of a high resolution touch screen, capable of output of images and text; a camera with dedicated Graphic Processing Unit, which controls image refinement and display; an accelerometer, for detecting the attitude of the device in reference to gravity, the latter a necessary part in maintaining up-right views on the screen irrespective of the way the device is held; and the ability to execute after-market application programs. Input is mostly through the touch screen, with a few designs utilizing a keyboard.

With the advent of one-piece monolithic or slate design in smart phones which can be held and operated with one hand, immediate wireless short message exchanges (herein referred as messaging) are increasingly used for communication between users. When these exchanges become engaging, users often are reading or typing messages (herein referred to as texting) while walking, keeping the devices in their half-extended hands and bending their heads downward to read the contents of the screens. Most users hold the screens tilted, with the top ends of the devices about a few degrees to 60 degrees above the horizon. In these walking while texting postures, obstacles more than a step ahead are outside of their visual fields. While collisions with pedestrians and stationery objects cause minor injuries, walking into moving traffic has serious consequences.

Recent advances in digital camera technology have provided mobile phone digital camera modules that are light weight and smaller than 10 mm in any Cartesian dimension, comprise the lenses, focusing mechanisms, and sensor circuitries. The output format of these camera modules has been standardized and involves about a dozen connectors or soldered surface-mounted connections between the camera assembly and other components responsible for further processing of camera images, namely the graphic processing unit (GPU) and the memory on the main circuitry.

Recent developments in the operating systems of mobile devices allow devices to run two programs on the same screen, enabling simultaneous display of a graphic image and any selected program. A part of the screen can be dedicated to an instantaneous image from the camera, while the other part can be used to execute the messaging software. For older operating systems that do not support split screen, immediate images from the camera can be displayed as a background of the messaging software by simple alterations in the display codes.

The recent design of most messaging or texting programs display each text message sent or received inside a demarcated area on the screen with opaque background called a text bubble. These can be altered to any degree of transparency, so camera views of the frontal horizon, when displayed as background, are clearly visible.

The present invention is a novel method to deliver to the screen a continuous frontal view of the walking while texting user, independent of the attitude the smart phone is held, by creating new hardware and software for a smart phone, comprises (a) novel mechanical designs of a moveable camera assembly consisting of a camera inside a casing, the latter is hinged appropriately to the main body of the mobile phone to allow easy positioning by a small stepper motor, to rotate and, in some cases, move the camera assembly outwards on deployment, while maintaining the continuity of the physical profile of the smart phone when stowed; (b) provision of a wide angle view for the camera; (c) utilizing data from an accelerometer to program the camera to point forward at the horizon for all positions the mobile phone is held during texting, with capability of continuous adjustments; (d) presentation on the screen of said frontal view by appropriate software for the particular operating systems and application programs; and (e) optional provision of simple analysis of the captured images to trigger alerts to the user.

There are prior art that disclose cameras of mobile devices capable of pointing forward with fixed angles to the display screens, and some able to provide frontal views with manual adjustments. In USP application 2005/001922 by Lee, a disclosure is made of a mountable camera which angle with the mobile communication device is manually adjustable. In USP application 2006/0197863 by Kim, a camera capable of being rotated inside a transparent casing and manually adjusted by a sliding bar is disclosed. Pan discloses in U.S. Pat. No. 7,392,071 a separate manually adjusted rotary module with a digital camera hinged to the main body of a clam-shell style mobile phone. In U.S. Pat. No. 7,425,100, Castaneda discloses a retractable camera that can be manually extricated and positioned in a clam-shell type mobile device. Kessler discloses in U.S. Pat. No. 9,654,675 a system of prisms, each with a different property, manually removed and replaced, to redirect the view of the camera at different device positions. All these disclosures have the capability of pointing the camera in the frontal direction, but only when the communication device is held at a fixed position, and none capable of automatically adjusting the camera direction to provide a continuous frontal view during variation of the mobile device attitude. Furthermore, none of these disclosures provide useful wide angle frontal images to guide the walking while texting user, and merge said images onto the screen. This present invention provides improvements over these limitations, by employing new mechanical, electrical and optical designs, and a stepper motor controlled by the CPU to position the hinged camera utilizing data from an accelerometer, while maintaining a compact design.

Another two pertinent disclosures are USP application 2013/0231157 by Chung, and USP application 2015/0123992 by Mahan. In the former application, a disclosure is made for a design where the camera is placed at the front edge area of a cellular phone, supplying an image to be merged with contents derived from internet communication. This design is limited to users who hold their screens flat, and excludes any other texting position. The application by Mahan pertains to "environmental signal representing actual images" from one or more cameras, the latter mounted to the wireless device on a beveled edge, these cameras are "caused" to "face forward relative to the screen". The disclosure is not about images from the cameras, but the corresponding 'environmental signal' which are non-specific, and does not pertain to actual wide angular FOV views captured by the camera. There is no specified capability to automatically adjust to user position in order to maintain a continuous frontal view.

In summary, the present invention is novel, and an improvement over all prior arts. In this invention the camera is given the ability to rotate, or extend and retract, and able to continuously adjust with the attitude data from an accelerometer. With provisions of novel optical structures and new software, this invention provides a wide angle image of the frontal horizon of the walking while texting user, irrespective of how the user holds the smart phone; and present the image onto the screen to help navigate the forward path.

BRIEF DESCRIPTION OF THE DRAWINGS

While the specification concludes with claims distinctly particular with the method of the invention and the preferred embodiments and variations, the descriptions and drawings herein are non-limiting examples, provided to facilitate better understanding of the invention disclosed herein. These are conceptual in general, with approximate proportions and arrangements, and are not to be considered as limiting examples of variations or modifications.

DETAIL DESCRIPTION OF THE INVENTION

The typical recent personal smart mobile communication device comprises a high resolution touch screen for display, with capability to run multiple applications is herein referred simply as a smart phone. Most, if not all, has a monolithic design, with width that fits in the hand of the user; with thickness about 10 mm, almost flat on both the front and rear surfaces; with the touch screen occupying most of the front surface; a camera in the upper part of the rear facing surface; and usually another camera in the front facing surface. The input can be through the touch screen, or through a hardware keyboard.

The present invention is a method, with variations, and the embodiments of said method and variations, to aid the walking while texting user of a smart phone, by pointing a camera at the forward horizon to provide a wide angle frontal view on the screen. The direction of the camera is continuously adjusting to changes of the user's hand position. In order to realize said functions, new entities including new electrical connections, new optical elements, new mechanical devices, and new software, are necessary.

Figure 1:
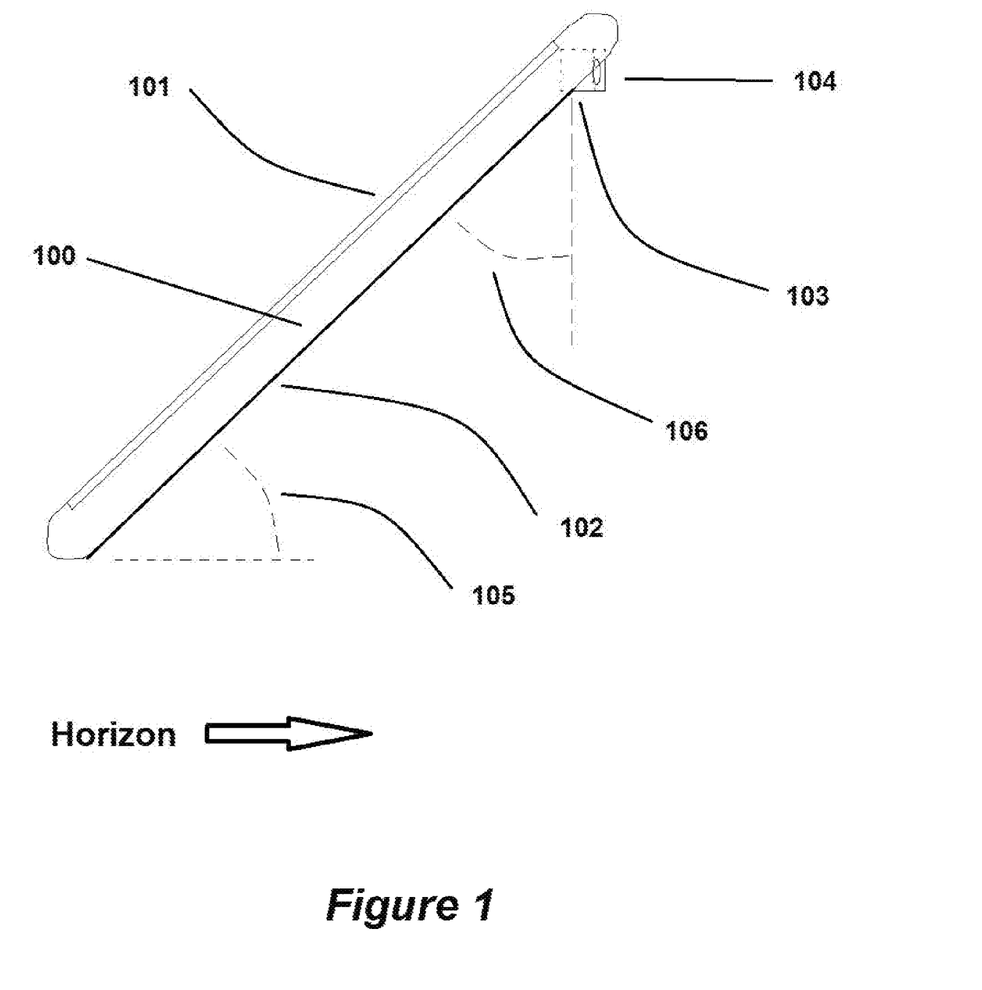
FIG. 1 is a side view of a smart mobile communication device having a high resolution touch screen (a smart phone) held in the typical attitude of texting with the moveable camera assembly deployed.

The first part of this method involves adding several novel mechanical designs to the existing smart phone. The first new mechanical design involves the camera, by providing it with flexible electrical connections to the circuitry on the main body of the smart phone, and placing the camera in a casing that allows the camera to rotate, and in some embodiments be swung away from the main body, and to point in the forward direction. When the camera is attached or enclosed in a moveable casing, the entirety is herein called the moveable camera assembly. One embodiment for said moveable camera assembly is to have it positioned in the upper part of the rear surface of the smart phone. FIG. 1 shows schematically this embodiment as a side view of a smart phone when held by a walking while texting user. The smart phone 100 comprises a high resolution screen 101 on the front surface, a rear facing surface 102, with a rear-facing camera in a moveable camera assembly 103 hinged on the main body near the upper end of the device. The smart phone is shown in a typical position of use, at an angle of 105 with the horizon as indicated, and the moveable camera assembly deployed and swung away from the body, with the lens 104 pointing forward horizontally. From the flushed stowage position the moveable camera assembly has moved through an angle of 106, the latter being equal to 90 degrees minus the grip attitude angle 105. Appropriate design of the casing and the hinge will permit a range of movement of up to 90 degrees if the camera in the moveable camera assembly is a rear-facing camera, such as in FIG. 1, and a range of movement up to 180 degrees if the camera is a front-facing one.

Figure 2:
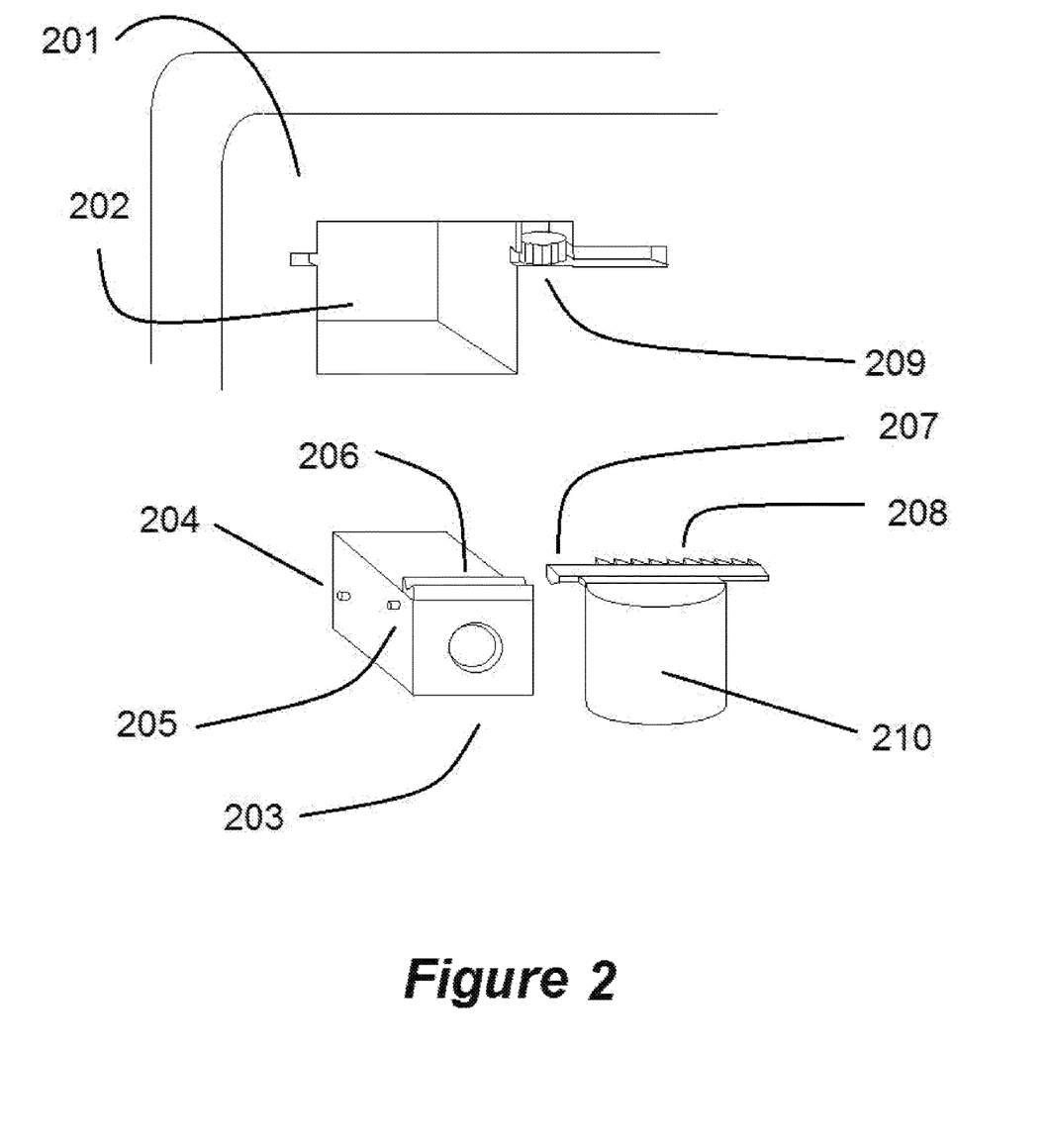
FIG. 2 is an exploded view of an embodiment of a moveable camera assembly in a smart phone with a moveable additional refractive component, and the associated mechanical system.

The second new mechanical design is to provide a wide angular field of view for the camera by either having the camera equipped with a wide-angle lens, or provision of an additional refractive element positioned in front of the usual portrait camera lens to increase the angular FOV when the function is requested. The latter method returns portrait photograph capability to the camera once the additional refractive element is moved away from the lens. The additional lens can be manually moved into place, or can be positioned by an electro-mechanical system controlled by the CPU of the smart phone. FIG. 2 shows the right upper corner of the rear surface of a smart phone, with an embodiment of the camera with moveable refractive element which can be deployed automatically. Here, the rear surface of the smart phone is indicated by 201, with cavity 202 on the main body which houses the moveable camera assembly 203. The moveable camera assembly 203 is shown removed from the cavity 202, without showing the flexible electrical connections, with the hinge pin 205 on the side at the upper outer area of the assembly, and the positioning pin 204 on the same surface. A groove 206 is affixed to the top surface on the edge, which admits the sliding tongue 207, with a row of teeth 208 facing inwardly to engage a gear 209. The convex refractive element 210, which in this example is a cylindrical lens, is attached to the tongue 207. When the gear 209 is rotated against the row of teeth 208, the tongue 207 with the cylindrical lens 210 is moved to a position over the camera lens; and when rotated in the opposite direction the cylindrical lens 210 is moved away from the camera lens. The driving component that rotates the gear 209 is not shown, and can be one of many rotating devices, such as a stepper motor, with or without gears. The moveable camera assembly, once with the refractive element properly placed, is flipped outwards by the camera positioning system to point at the forward horizon.

The third novel mechanical design is to replace the rigid connections or surface-mounted contacts between the camera assembly and the main circuitry, which numbers about twelve in most camera designs with either flexible ribbon connectors, or some form of rotary electrical interface, in order to maintain data connection when the camera assembly is swung outwards.

Figure 3:
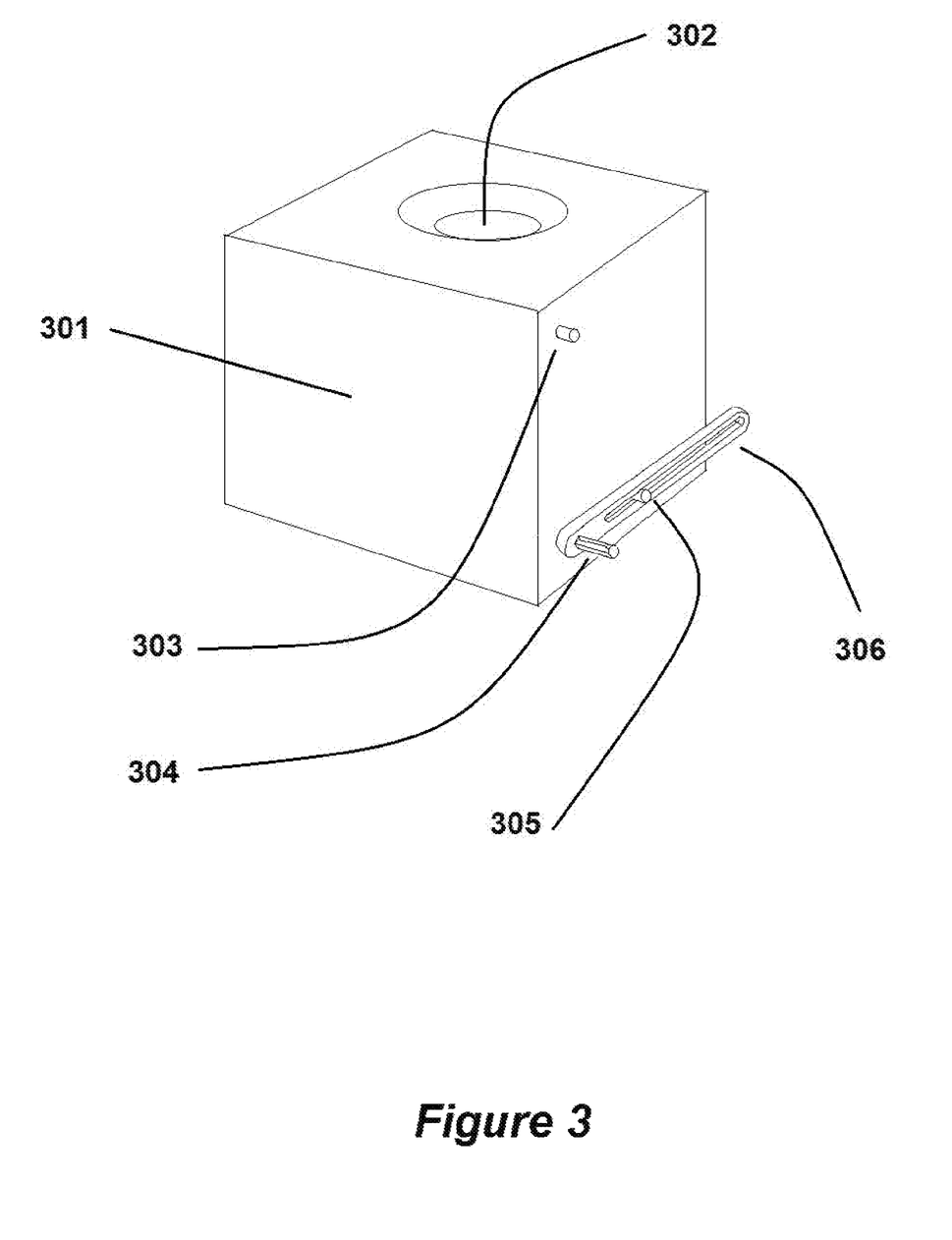
FIG. 3 is a view of the mechanical elements in one of the possible embodiments of the camera positioning system.

The next and fourth new mechanical design is to provide means to swing the moveable camera assembly to the appropriate angle away from the body to maintain a forward horizon view in the camera. There are numerous methods this motion can be achieved. FIG. 3 shows one embodiment of the camera positioning system with some of the components. The orientation of this figure is with the rear face of the smart phone pointing upwards, and the camera in the stow position. The moveable camera assembly comprises the camera assembly casing 301, the digital camera with the lens 302, the hinge pin 303 at the outer corner of the casing which rests in a dedicated hole on the main body, the latter is not shown in the figure for reason of simplicity. On the lateral surface of the camera assembly, a positioning pin 305 affixed to the assembly casing and some distance from the hinge pin 303. Positioning pin 305 is fitted inside the hollowed slot of a positioning arm 306, and can slide within the slot. At the end of the arm 306 is an axle 304, which is connected to a rotating motor directly or via gears. The rotating mechanism is not shown. Rotation about the axle 304 causes the slotted arm 306 to rotate, and the positioning pin 305 to slide inside the slot as a result. The whole moveable camera assembly 301 will rotate about the hinge pin 303.

Figure 4:
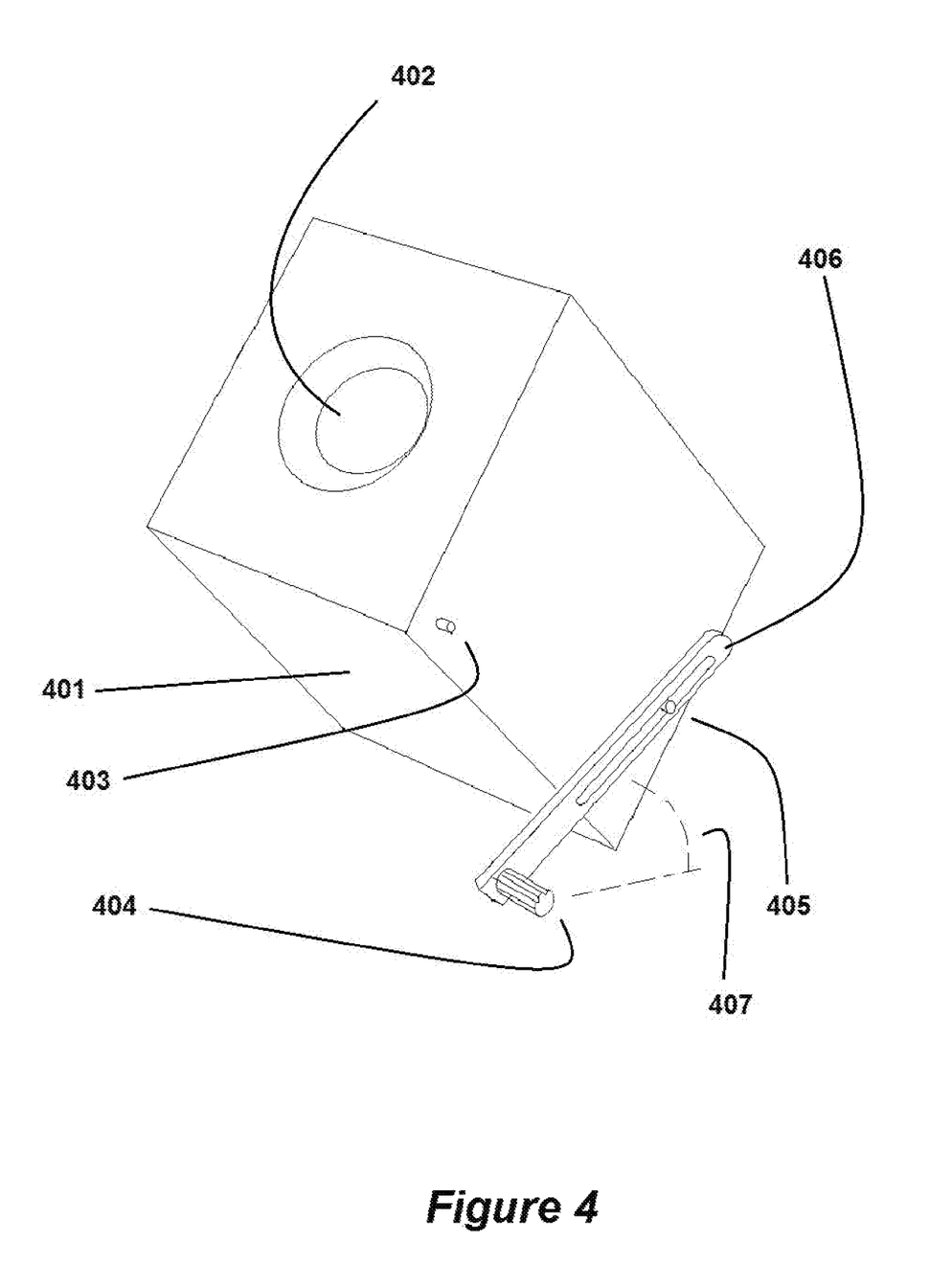
FIG. 4 is a view of the moveable camera assembly with the camera positioning mechanism when deployed.

For the particular embodiment shown in FIG. 3, FIG. 4 shows the relative positions of the basic components of the camera positioning system when the camera is deployed. In this figure, the camera assembly 401 is tilted with the camera lens 402 pointing about 30 degrees from the position shown in FIG. 3 with the hinge pin 403 rotated inside the dedicated hole, the latter is not included in the figure. The positioning arm 406 is rotated by driving force acting through the axle 404, with the actual drive not shown for simplicity. The angle the positional arm has rotated through from the stowage position is 407, and the positioning pin 405 has slid up the slot provided in the positioning arm.

Figure 5:
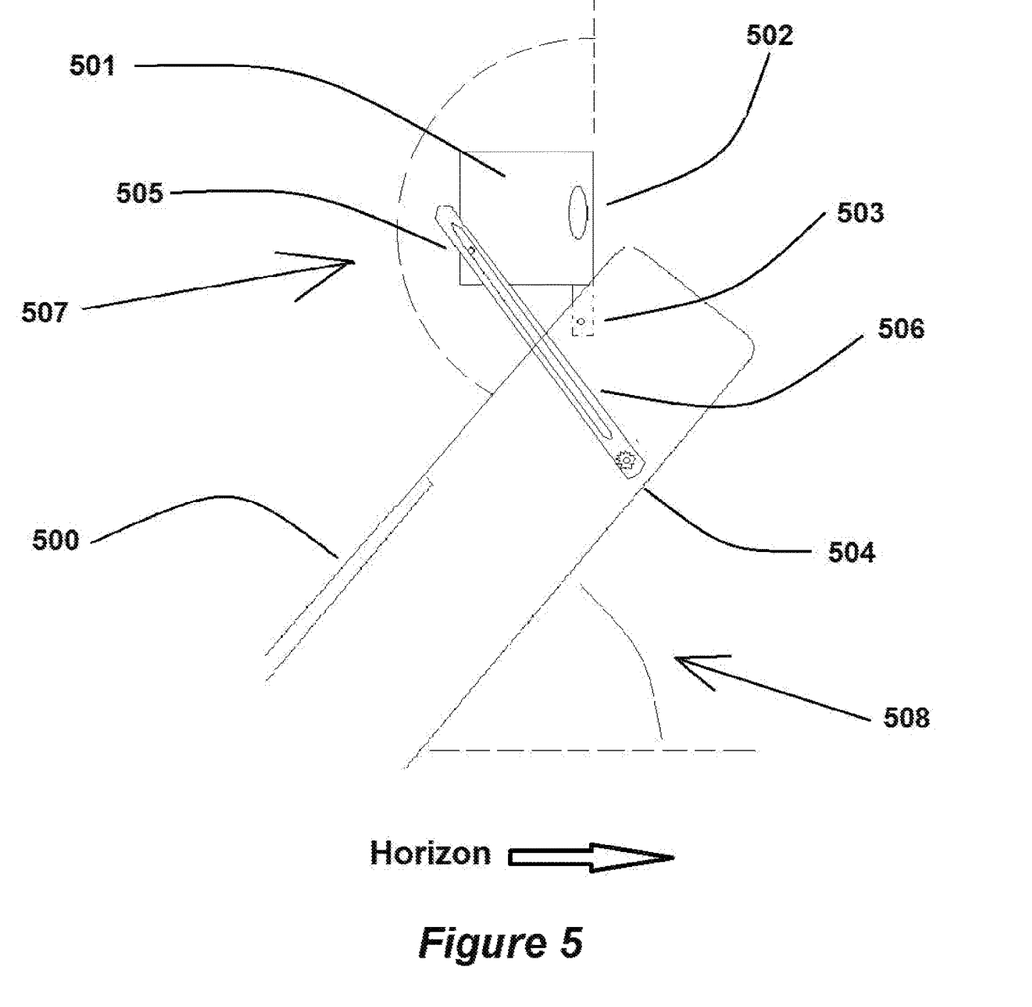
FIG. 5 is a schematic side view of a front-facing moveable camera assembly.

FIG. 5 is a schematic of the side view of a smart phone with touch screen 500, showing the front-facing camera 502 in a moveable camera assembly 501, with the hinge 503 on the front surface. The positioning arm 506 with the moveable camera assembly positioning pin 505 in the sliding slot has rotated the camera lens to point in the forward direction. The angle of the screen with the horizon is 508, and the front-facing camera in the moveable camera assembly has been rotated an angle of 507 about the hinge 503. The value of angle 507 is 90 degrees plus the value of angle 508. The gear 504 is powered by a rotating mechanism not shown in this figure.

Figure 6:
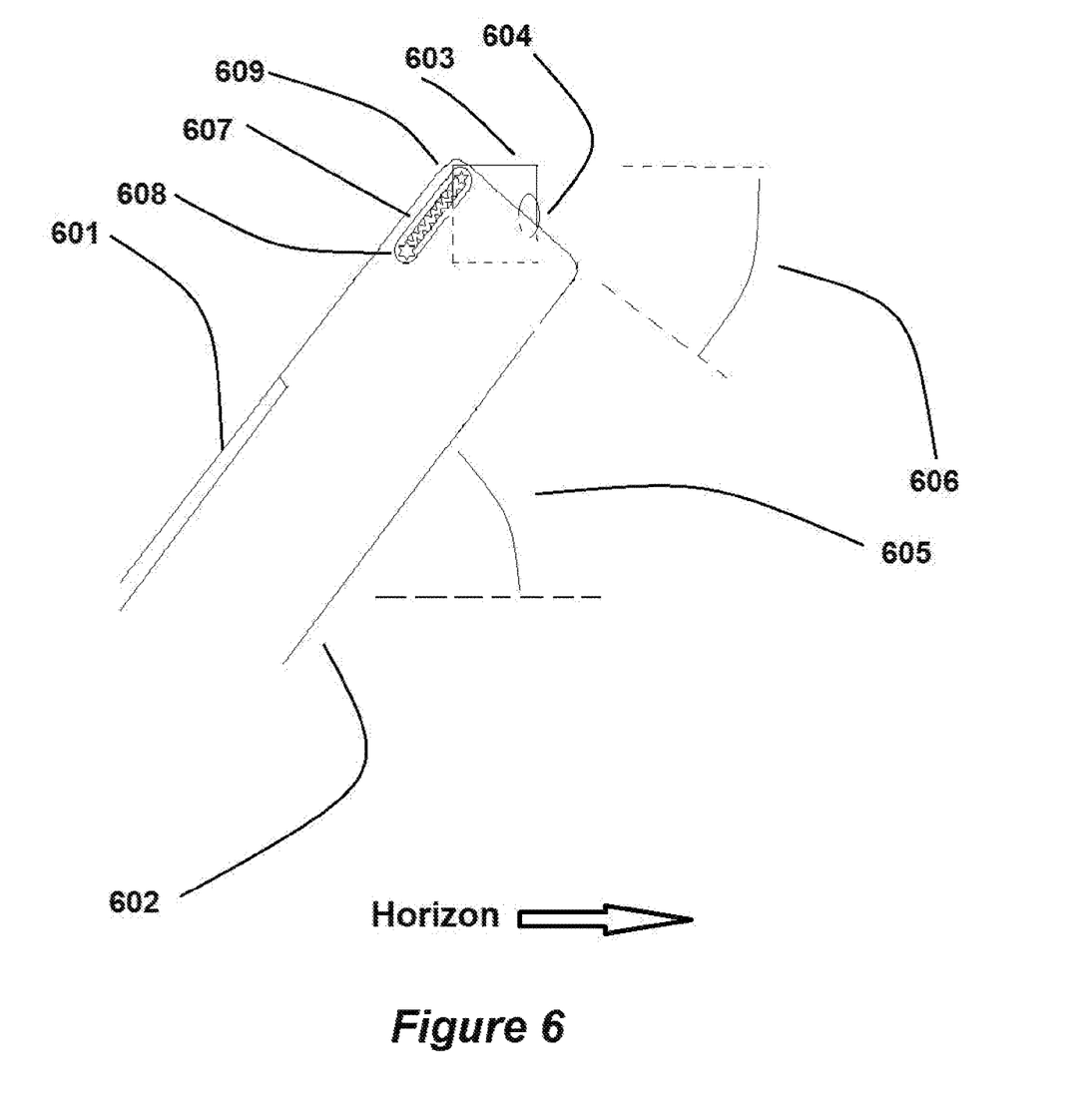
FIG. 6 is a schematic side view of a rear-facing moveable camera assembly with the hinge pin at the front upper edge of a smart phone.

One embodiment of this novel method is to have the position of the hinge at the upper edge of the smart phone. FIG. 6 is a schematic side view of one embodiment wherein the hinge 609 is at the upper front edge of the device with touch screen 601, and rear surface 602. The moveable camera assembly 603 has the lens 604 pointing forward. The hinge 609 comprises a pivot pin with a smooth segment for passive rotation, and a tooth gear segment, the latter rotated by gear 608 through the traction belt 607. In the figure, the angle of the screen with the horizon is 605, and the moveable camera assembly 603 with lens 604, has been rotated by angle 606, the value of which is 90 degrees less value of angle 605.

Figure 7:
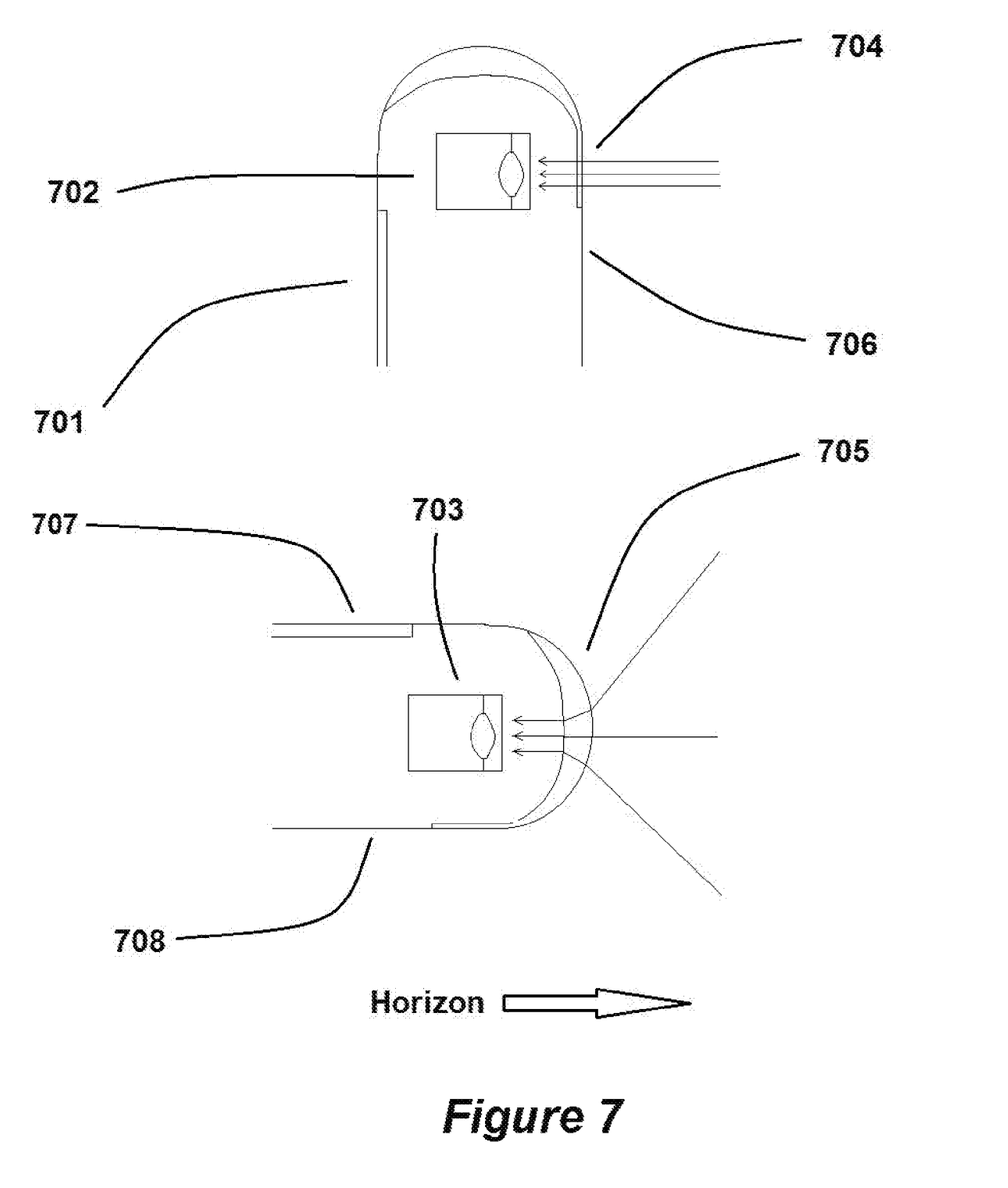
FIG. 7 is a simplified illustration of a transparent enclosure of a moveable camera assembly, the latter with capability of pointing at different parts of said transparent enclosure with varying refractive properties.

One embodiment which employs one driving motor for both camera pivoting and changeable wide angle FOV for the camera. is described in FIG. 7. With this embodiment, the camera in the moveable camera assembly is a rear-facing camera of the smart phone in close proximity to the top end, within a transparent enclosure continuous with the monolithic body which is large enough to allow the required range of movement of the camera assembly. The said enclosure has a plane surface in front of the camera lens when the camera assembly is in the stow position, and a convex refractive optical structure over the camera lens in positions of deployment. FIG. 7 illustrates the effects of the varied geometry of the clear enclosure, showing the convex refractive part acting as an addition lens to increase the angular field of view.

The upper part of FIG. 7 shows the smart phone being held with the touch screen 701 in the vertical position, and the camera in the moveable camera assembly 702 pointing forward, in the typical position of photograph taking. Images are captured by the camera in the moveable camera assembly 702 through a planar transparent element 704, the latter in smooth continuity with the rear surface 706 of the smart phone. The motor and drive elements, which can be of various design, are not shown for simplicity. The lower part of FIG. 7 shows the smart phone held in a horizontal position, with the touch screen 707 facing up, in a common texting position. The camera in the moveable camera assembly 703 has been rotated through 90 degrees about the pivot, and is pointing forward, capturing images through a convex refractive optical element 705 which provides a wider angle FOV. This convex refractive optical element 705 is also in smooth continuity with the surrounding surfaces 708.

Figure 8:
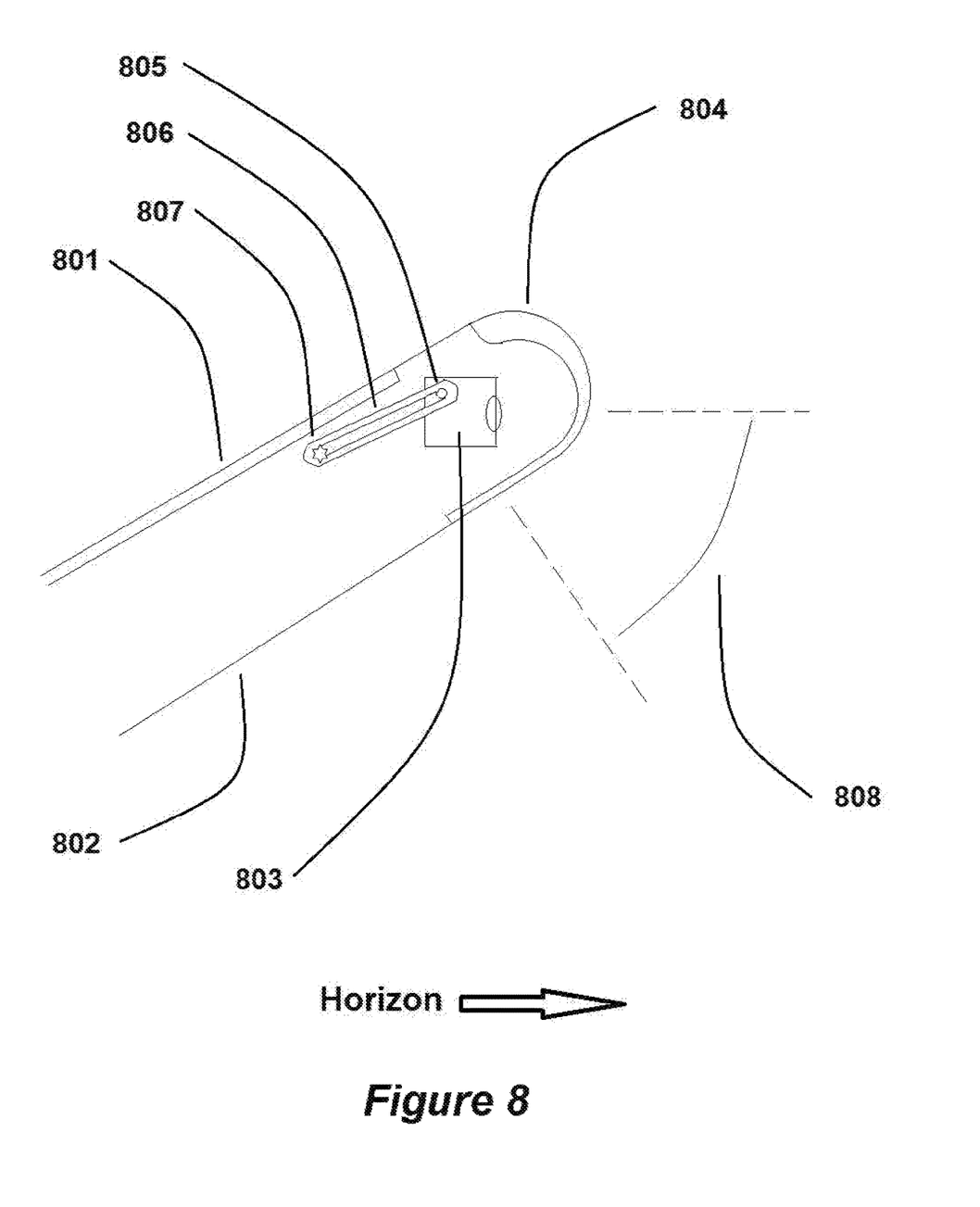
FIG. 8 is a schematic side view of a rear-facing moveable camera assembly with rotary capability at the top end of the smart phone within a transparent enclosure of varying convexity.

FIG. 8 is a schematic drawing of a varying refractive enclosure with a moveable camera assembly in the deployed position, with 801 being the screen on the front surface, 802 the rear surface, and 804 being the transparent varying curvature enclosure. The moveable camera assembly 803 is hinged at the pin 805, and being rotated about the hinge by gear 807 acting through a traction belt 806. The driving mechanism is not shown for simplicity. The moveable camera assembly has rotated through the angle of 808 from the stowage position to point at the forward horizon through an optical structure which increases the angular FOV. With this embodiment, having the pin 805 positioned in the center of the casing of the moveable camera assembly to enable rotation can be the most compact design.

The described mechanical designs with the corresponding driving systems are electrically connected to available output ports of the CPU, through which the actual digital signals needed to control the driving motors for both the camera positioning system, such as rotation of the axle 404 in the embodiment described in FIG. 4, and the moveable refractive element system actuated via gear 209, are transmitted.

The second part of the present novel method involves new software to control the moveable camera assembly and the optional lens, in the user interface application software, and in image presentation captured by the camera.

Low level programs are needed to control the aforementioned mechanical systems. Recent improved mobile phone operating systems all have provision for application software to access information from the accelerometer. From the value of the tilt angle (item 105, FIG. 1), the amount of movement needed to position the moveable camera assembly system is repeatedly calculated, and the position repeatedly adjusted, such that the camera is continuously moved to point at the frontal horizon. The software to control the moveable refractive element system, if present, is called on only at the start and the end of the operation.

The next aspect in software manipulation of the novel method is the user interface application software which initiates the low level programs and when requested, triggers the de-selection of the camera, and the stowage of the moveable camera assembly with any moveable refractive component. Software is also needed to present the camera view to the screen, either as the background or on part of the screen. Modification of existing immediate messaging and texting software is needed for some operating systems.

Lastly, software can be incorporated to analysis the image captured by the front-pointing camera. Two particular situations avail themselves for simple software detection of possible danger, namely, a repetitive flashing light in the same area of the image, and a fast moving image across the frontal view. Audible or visible alerts can be generated through the smart phone to warn the walking while texting user.

I claim:

1. A method that provides a continuous, self-adjusted, wide-angle view of a frontal horizon to a user of a smart mobile communication device who is walking while texting with head down, such that obstacles and dangers in a forward path of the user are displayed on a screen, utilizing following mechanisms and designs, comprising the steps of:
   a) providing a design of a moveable camera assembly in which a digital camera with a wide angular field of view lens is mounted on a casing, and said moveable camera assembly hinged to an upper part of the smart mobile communication device, with an appropriate range of movement;
   b) providing a first mechanism with ability for said moveable camera assembly to be rotated or swung about a hinge on a main body of the smart mobile communication device, so as to point towards the frontal horizon of an intended path of travel of the user, and with ability to retract into the main body when desired, preserving continuity and a smooth contour with surrounding surfaces of the main body;
   c) providing said digital camera with the wide angular field of view lens, or a provision for a second mechanism wherein a refractive element can be moved in front of the wide angular field of view lens of the digital camera to increase an angular field of view (FOV) when the digital camera is deployed, and can be moved away from the wide angular field of view lens in stowage, either manually or under control of software and actuation by a central processing unit (CPU) and necessary mechanical system;
   d) providing flexible electric connectors or rotary electrical interfaces between the digital camera in said moveable camera assembly and a main circuitry board, allowing appropriate movements of the moveable camera assembly while maintaining necessary data transfer;
   e) providing a camera positioning system which is able to rotate, extend or swing said moveable camera assembly outwards, or to retract said moveable camera assembly for stowage flushed with surrounding surfaces of the main body, comprises (1) mechanical connections between the main body of the smart mobile communication device and the casing permitting the appropriate movements; (2) a driving system, using either mechanical or electro-magnetic forces; and (3) control by the CPU or a dedicated microprocessor;
   f) providing a catch to keep the moveable camera assembly locked in stowage, with engaging and releasing mechanisms under control of the CPU or said dedicated microprocessor;
   g) providing capability of sampling an accelerometer in the smart mobile communication device for continuous information of attitudes of the smart mobile communication device, forwarding information of attitudes to the CPU, and calculating an appropriate amount of action needed for the camera positioning system, for such motions as rotation, extension and retraction, ensuring the digital camera in the moveable camera assembly is always pointing forward horizontally;
   h) providing software to capture views by said digital camera, and display the views on the screen of the smart mobile communication device as a background of a messaging application program, or on a split screen;
   i) provision of an image analysis software whereby flashing lights and fast moving objects in said captured views trigger audio and visual alarms;
   j) providing capabilities to select and deselect said digital camera, said camera positioning system, image acquisition by said digital camera, and corresponding displays on the screen.

2. A method as in claim 1, where the digital camera in the moveable camera assembly is a rear-facing camera of the smart mobile communication device, with the hinge in close proximity to a rear surface, with the moveable camera assembly enabled to swing outward of the rear surface when deployed, and with an angle which said moveable camera assembly can swing about the hinge is up to 90 degrees.

3. A method as in claim 1, where the digital camera in the moveable camera assembly is a rear-facing camera mounted on a top edge of the smart mobile communication device, with a surface of the moveable camera assembly flushed with a top border of the smart mobile communication device when stowed, and the hinge in close proximity to a front surface, when deployed, the moveable camera assembly stays within a plane of a rear surface, and an angle which said moveable camera assembly can swing about the hinge is up to 90 degrees.

4. A method as in claim 3, where the digital camera in the moveable camera assembly is provided with a clear enclosure, with a surface continuous with adjacent surfaces of the smart mobile communication device, said clear enclosure of optical quality material with or without varying refractive property in different regions.

5. A method as in claim 1, where the moveable camera assembly stays entirely within the smart mobile communication device, and is pivoted about a center of the casing, and rotated about a pivot by an appropriate rotary mechanism under a continuous control of the CPU.

6. A method as in claim 5, where the digital camera in the moveable camera assembly is provided with a clear enclosure, with a surface continuous with adjacent surfaces of the smart mobile communication device, said clear enclosure of optical quality material with or without varying refractive property in different regions.

7. A method as in claim 1, where the digital camera in the moveable camera assembly is a front-facing camera of the smart mobile communication device, with the hinge in close proximity to a front surface, with the moveable camera assembly enabled to swing outward of the front surface when deployed, and with an angle which said moveable camera assembly can swing about the hinge is up to 180 degrees.

8. A method as in claim 1, where the digital camera in the moveable camera assembly is a front-facing camera mounted on a top edge of the smart mobile communication device, with a surface of the moveable camera assembly flushed with a top border of the smart mobile communication device, and the hinge in close proximity to a rear surface, when deployed, the moveable camera assembly stays within a plane of a front surface, and an angle which said moveable camera assembly can swing about the hinge is up to 180 degrees.

9. A method as in claim 8, where the digital camera in the moveable camera assembly is provided with a clear enclosure, with a surface continuous with adjacent surfaces of the smart mobile communication device, said clear enclosure of optical quality material with or without varying refractive property in different regions.

10. A smart mobile communication device capable of providing a continuous, self-adjusted, wide-angle view of a frontal horizon to a user of the smart mobile communication device who is walking while texting on a screen, comprising following mechanisms and designs added to said smart mobile communication device:
   a) a moveable camera assembly comprises a digital camera is mounted on a casing, and said moveable camera assembly hinged to an upper part of said smart mobile communication device, with an appropriate range of movement;
   b) a first mechanism providing ability for said moveable camera assembly to be rotated or swung outwards about a hinge on a main body of the smart mobile communication device, so as to point towards the frontal horizon of an intended path of travel of the user, and said moveable camera assembly when retracted is even with surrounding surfaces of the smart mobile communication device, maintaining a smooth contour;
   c) a second mechanism to increase an angular field of view (FOV) for said digital camera, wherein a refractive element can be moved in front of a lens of the digital camera when the moveable camera assembly is deployed, and be moved away in stowage, either manually or under control of software and actuation by a central processing unit (CPU) and necessary mechanical system;
   d) flexible electrical connectors or rotary electrical connectors, from input and output ports of said digital camera in said moveable camera assembly to an image data graphics processing unit (GPU) or other hardware on a main circuitry board, permitting appropriate movements of the moveable camera assembly while maintaining necessary data transfer;
   e) a camera positioning system to rotate, extend or swing said moveable camera assembly outwards, or to retract said moveable camera assembly for stowage flushed with surrounding surfaces of the main body, comprises (1) mechanical connections between the main body of the smart mobile communication device and the casing permitting the appropriate movements; (2) a driving system, using either mechanical or electro-magnetic forces; and (3) control by a CPU or a dedicated microprocessor;
   f) a catch to keep the moveable camera assembly locked in stowage, with engaging and releasing mechanisms under control of the CPU or said dedicated microprocessor;
   g) access of information by the CPU from an accelerometer in the smart mobile communication device for continuous information of attitudes of the smart mobile communication device;
   h) software to determine an amount of controlling action needed for the camera positioning system to cause an appropriate rotation, extension or retraction for the moveable camera assembly such that the digital camera in the moveable camera assembly is always pointing forward horizontally;
   i) software to present captured views by said digital camera in the moveable camera assembly to the screen of the smart mobile communication device, as a background of a messaging application program, or on a split screen;
   j) image analysis software whereby flashing lights and fast moving objects in said captured views can trigger audio and visual alarms;
   k) software to enable selecting and deselecting said digital camera, said camera positioning system, and all related processes.

11. A smart mobile communication device as in claim 10, where the digital camera in the moveable camera assembly is a rear-facing camera, with a hinge in close proximity to a rear surface, with the moveable camera assembly able to swing outward of the rear surface when deployed, through an angle up to 90 degrees.

12. A smart mobile communication device as in claim 10, where the digital camera in the moveable camera assembly is a rear-facing camera mounted on a top edge of the smart mobile communication device, with a surface of the moveable camera assembly flushed with a top border of the smart mobile communication device when stowed, and a hinge in close proximity to a front surface, when deployed, the moveable camera assembly stays within a plane of a rear surface, and an angle which said moveable camera assembly can swing about the hinge is up to 90 degrees.

13. A smart mobile communication device as in claim 12, where the digital camera in the moveable camera assembly is provided with a clear enclosure, with a surface continuous with adjacent surfaces of the smart mobile communication device, said clear enclosure of optical quality material with or without varying refractive property in different regions.

14. A smart mobile communication device as in claim 10, where the moveable camera assembly stays entirely within the smart mobile communication device, and is pivoted about a center of the casing, and rotated about a pivot by an appropriate rotary mechanism under a continuous control of the CPU.

15. A smart mobile communication device as in claim 14, where the digital camera in the moveable camera assembly is provide with a clear enclosure, with a surface continuous with adjacent surfaces of the smart mobile communication device, said clear enclosure of optical quality material with or without varying refractive property in different regions.

16. A smart mobile communication device as in claim 10, where the digital camera in the moveable camera assembly is a front-facing camera, with the hinge in close proximity to a front surface, with the moveable camera assembly capable of swinging outward of the front surface when deployed with a range of up to 180 degrees.

17. A smart mobile communication device as in claim 10, where the digital camera in the moveable camera assembly is a front-facing camera mounted on a top edge of the smart mobile communication device, with a surface of the moveable camera assembly flushed with a top border of the smart mobile communication device, and the hinge in close proximity to a rear surface, when deployed, the moveable camera assembly stays within a plane of a front surface, and an angle which said moveable camera assembly can swing about the hinge is up to 180 degrees.

18. A smart mobile communication device as in claim 17, where the digital camera in the moveable camera assembly is provided with a clear enclosure with a surface continuous with adjacent surfaces of the smart mobile communication device, said clear enclosure of optical quality material with or without varying refractive property in different regions.

* * * * *